United States Patent [19]

Henderson

[11] Patent Number: 4,930,347
[45] Date of Patent: Jun. 5, 1990

[54] SOLID STATE MICROANEMOMETER WITH IMPROVED SENSITIVITY AND RESPONSE TIME

[75] Inventor: H. Thurman Henderson, Cincinnati, Ohio

[73] Assignee: University of Cincinnati, Cincinnati, Ohio

[21] Appl. No.: 355,980

[22] Filed: May 23, 1989

[51] Int. Cl.$^5$ .................... G01F 1/68; H01L 21/302
[52] U.S. Cl. ..................... 73/189; 73/204.25; 156/633; 156/649; 156/651; 156/657; 156/662; 357/28
[58] Field of Search ............... 73/189, 204.23, 204.25, 73/204.26, 204.27; 156/633, 649, 651, 657, 662; 357/25, 28

[56] References Cited

U.S. PATENT DOCUMENTS

| | | | |
|---|---|---|---|
| 3,996,799 | 12/1976 | van Putten | 73/204.26 |
| 4,472,239 | 9/1984 | Johnson et al. | 156/657 |
| 4,478,076 | 10/1984 | Bohrer . | |
| 4,478,077 | 10/1984 | Bohrer . | |
| 4,501,144 | 2/1985 | Higashi et al. . | |
| 4,548,078 | 10/1985 | Bohrer et al. . | |
| 4,594,889 | 6/1986 | McCarthy | 73/204.26 |
| 4,624,137 | 11/1986 | Johnson et al. . | |
| 4,651,564 | 3/1987 | Johnson et al. . | |
| 4,682,503 | 7/1987 | Higashi et al. . | |
| 4,683,159 | 7/1987 | Bohrer et al. . | |
| 4,696,188 | 9/1987 | Higashi . | |
| 4,706,061 | 11/1987 | Johnson . | |
| 4,739,657 | 4/1988 | Higashi et al. . | |
| 4,784,721 | 11/1988 | Holmen et al. . | |
| 4,790,181 | 12/1988 | Aine | 156/662 |

OTHER PUBLICATIONS

Allen, Roger, "Solid State Sensors", Electronic Design, Nov. 13, 1986.
Hsieh, M. Walter, "Development of an Integrated Gas Flow Tranducer Based Upon Deep Impurities and Anisotropic Etching", Department of Electrical and Computer Engineering, University of Cincinnati, Mar. 3, 1987.
Gallant, John, "Sensors Offer Fast Response Times", EDN, May 25, 1989.
Sundberg, Galer, "Microtronic Flow Transducer", NASA Tech Briefs, May 1989.

Primary Examiner—Herbert Goldstein
Attorney, Agent, or Firm—Wood, Herron & Evans

[57] ABSTRACT

A solid state microanemometer with improved sensitivity and response time is micromachined out of a single deep level doped semiconductor crystal and includes four corner supports interconnected to four spanning members which form the resistor legs of a Wheatstone bridge. The bottom of the supports are electrostatically bonded to a glass plate, thus thermally isolating the resistor legs a predetermined distance above the top surface of the plate and electrically isolating the supports. Electrically conductive material deposited on the four corner supports provides electrical contacts which enable a voltage to be applied across the resistor legs. Preferably, an n+ material is diffused into the region of the crystal located beneath the electrically conductive material, and the exposed surfaces of the crystal are sealed with a passivation layer.

39 Claims, 2 Drawing Sheets

SOLID STATE MICROANEMOMETER WITH IMPROVED SENSITIVITY AND RESPONSE TIME

FIELD OF THE INVENTION

This invention relates to a Wheatstone bridge anemometer, and more particularly, to a solid state microanemometer having improved temperature sensitivity and response time.

BACKGROUND OF THE INVENTION

An anemometer is a device which measures the velocity and direction of gas flow. A Wheatstone bridge can be used as an anemometer. A Wheatstone bridge comprises four resistances connected together in a square configuration, with two pairs of parallel connecting legs forming the sides of the square, and four electrically conductive contacts located at the corners. Application of a known voltage between two diagonally opposed corner contacts results in a voltage reading on a meter connected across the other diagonally opposed corner contacts.

A Wheatstone bridge with four resistances of known value can be used as a sensor to measure parameters such as pressure, force, flow rate and direction. Such a Wheatstone bridge is symmetrical and, in principal, remains in balance for any ambient temperature. However, gas or other mass flow across the bridge cools the legs that are perpendicular to the flow. Because resistivity of most materials is temperature dependent, the flow affects the resistance of these legs, sets the bridge into imbalance and results in an voltage change corresponding to the velocity of the flow. Generally, the resistors most affected by the air flow will be the resistors that are oriented transverse to the direction of the air flow, the resistors whose entire length is exposed to the flow. However, the resistors oriented parallel to the flow will also be somewhat affected, depending upon the aspect ratio of the resistor legs. The aspect ratio is the ratio of the length to the width of each resistor leg. The sensitivity of such a device increases as the aspect ratio increases. Thus, for a Wheatstone bridge with legs of a predetermined length, sensitivity can be increased by decreasing the width of the legs.

An article entitled "Integrated Silicon Anemometer" authored by A. F. P. Van Putten and published in Vol. 10, No. 21 of *Electronics Letters* on Oct. 7, 1974, discloses a solid state silicon anemometer. This anemometer provides faster response time than prior "hot wire" anemometers, due to its smaller size. Briefly, a solid state silicon anemometer of this type consists of a planar 1.5×1.5 millimeter chip of n-type silicon with 4 p-type diffused regions forming the resistor legs of the Wheatstone bridge. Shallow impurities such as boron and phosphorus were used to achieve the n- and p-type doping, respectively. The resistors were connected at the corners by evaporated aluminum contacts.

There are several inherent problems with a solid state anemometer of this type. Because the voltage drops along the length of each resistor leg, the voltage differential at the isolation depletion region between the p-type material and the n-type material along the length also varies correspondingly. This causes the cross-sectional dimension of each resistor leg to be non-uniform along the length, resulting in non-uniform heating of the leg. This problem was somewhat overcome by extending the contacts in parallel conductor pairs along each of the legs, with each conductor connected at one of its ends to one of the corner contacts and a resistor leg residing between each conductor pair. This configuration produces voltage drop in a direction transverse to the orientation of the resistor leg, and also results in much lower bridge impedance, which may or may not be desirable.

Unfortunately, other more serious problems associated with devices of this type are not solved as easily. First, the high heat transfer rate of silicon (higher than that of most steels), tends to thermally short out the temperature differential between the parallel and the perpendicular bridge legs. With no measurable temperature differential, there is no differential change in resistance and no signal output to indicate flow rate. Thus, once heated, this solid state anemometer loses sensitivity to heat flow.

Secondly, because of the relatively large thermal mass of the silicon chip, a slight change in heat due to air flow must last long enough to overcome or impact upon the resistivity of the resistor leg, or it will go undetected altogether. Consequently, the time response for this circuit is quite long, typically in the range of a minute to several minutes, and flow variations of short duration typically go undetected. The response time for other microelectronic circuits is generally much faster, and thus this relatively slow response time hinders circuit compatibility with these devices. While further miniaturization of the device would speed up response time, further miniaturization would also compound the problem of thermal shorting, and thus miniaturization results in a further decrease in flow sensitivity. Further miniaturization also compounds problems associated with electrical shorting. Under the applied voltage, some current will leak between adjacent contacts via a route other than through the resistor legs, thereby affecting the relationship between the applied voltage and the measured voltage.

Finally, within the normal temperature range of most operative microelectronic circuits, the free carrier concentration of semiconductor devices doped with a shallow level impurity is substantially fixed, and does not change with temperature variation. Thus, the only factor influencing the temperature coefficient of resistance is the carrier mobility, which classically varies approximately as the $-(3/2)$ power of temperature. Therefore, the bridge leg resistance R may be expressed as:

$$R = CT^{3/2} \qquad \text{Eq. (1)}$$

where C is the constant of proportionality. Because the temperature coefficient of resistance is small, the flow sensitivity of each of these resistor legs is small. In other words, due to thermal shorting, the relatively large thermal mass of typical semiconductor crystals, fixed free carrier concentrations and to some extent, electrical shorting, solid state anemometers have achieved only a limited degree of success.

SUMMARY OF THE INVENTION

It is thus an objective of this invention to provide a solid state anemometer that overcomes problems associated with the high thermal conductivity of typical semiconductor materials such as silicon.

It is another object of this invention to provide a solid state anemometer with improved thermal, and therefore electrical response time.

It is still another object of the invention to provide a solid state anemometer with improved sensitivity and reduced response time.

It is another object to provide a solid state anemometer adaptable for integration into arrays along with associated computer interfaces in order to achieve sensing of microflow patterns for various applications.

This invention contemplates a solid state microanemometer micromachined out of a single semiconductor crystal doped with a deep level impurity, the micromachined crystal having four semiconductor resistor legs bridging between four semiconductor supports in a Wheatstone bridge configuration. Electrically conductive material deposited on the supports enables a voltage to be applied across each resistor leg. This configuration thermally isolates the resistor legs and electrically isolates the corner supports, thus preventing electrical shorting of the bridge and allowing the device to be miniaturized to achieve faster response time without sacrificing sensitivity due to thermal conductivity. Moreover, use of a deep level impurity further improves sensitivity, due to the fact that for a semiconductor doped with a deep level impurity, the free carrier concentration varies exponentially with temperature within the temperature range of most operative circuits.

To these ends, in accordance with a preferred embodiment of the invention, a solid state microanemometer with improved sensitivity and faster response time includes a gold doped silicon crystal micromachined on its top and bottom surfaces to form four resistor legs spanning to four corner supports, the supports being electrostatically bonded to a borosilicate glass base and having aluminum contacts deposited on their top surface to enable a voltage to be applied via the contacts to each of the resistor legs. The crystal also has phosphorus diffused or ion implanted electrical contact regions located beneath each of the metallized areas, and a silicon dioxide or silicon nitride outer layer to seal the crystal.

The resistor legs and the contacts lie substantially in the same plane, a plane which is located a predetermined distance above the top surface of the glass base and is based upon the original silicon wafer thickness. This predetermined distance is equal to the depth of the anisotropic etching (wet or plasma) that is performed on the backside, or bottom surface of the crystal to form a membrane. For a crystal wafer having a thickness of about 0.010", the backside etching step produces an upper membrane layer having a thickness of about 0.001" or less, through which membrane the resistor legs are formed. The resistor legs of this device are substantially thermally isolated from each other, the base and the corner supports. Thus, the device can be miniaturized in order to increase response time, without experiencing problems due to thermal conductivity.

The structure also permits gas flow between the resistor legs and the base, thereby exposing all the resistor leg surfaces to cooling due to gas flow and further enhancing sensitivity. The corner supports are electrically isolated by the electrostatically bonded base so that there is no electrical current shorting in the crystal and any voltage drop occurring between contacts located on top of the supports must occur along the resistor legs. Alternately, if external superstructure is to be used for additional support, or if the resistor legs are made thicker in order to increase the physical strength of the structure, the resistor legs may be isolated by p n junctions from the corner supports where the terminals are located. Finally, use of a semiconductor doped with a deep level impurity, i.e., gold doped silicon, provides increased sensitivity due to the fact that the free carrier concentration varies exponentially with temperature. Thus, a slight change in temperature will produce an enormous change in conductivity (inversely proportional to resistivity).

In a preferred method of forming the microanemometer of this invention, the top and bottom surfaces of a single silicon crystal doped with a deep level impurity, such as gold are anisotropically etched. In a sequence of photolithographic steps, phosphorus or any other n+ type shallow level impurity is diffused into the crystal in the regions where the aluminum contact material will be deposited. The bottom portions of the etched crystal which form the four corner supports are electrostatically bonded to a glass base. The exterior surfaces of the crystal are oxidized to form an impervious layer of silicon dioxide. The glass base is preferably then mounted on a package and connecting wires or leads are ultrasonically bonded to the electrical contacts of the device and connected to terminal pins of the package to produce a single microelectronic device. Mounting on the chip facilitates connection of the desired voltage and meter or associated circuitry to complete the Wheatstone bridge configuration.

Preferably, the span between adjacent supports includes a resistor leg that is sandwiched between parallel aluminum conductors, thereby directing applied voltage transverse to the orientation of each resistor leg. However, for higher electrical impedance, the electrodes will be located only at the corners.

These and other features of the invention will be more readily appreciated in view of the following detailed description and the drawings in which:

DETAILED DESCRIPTION OF THE DRAWINGS

Figure 1:
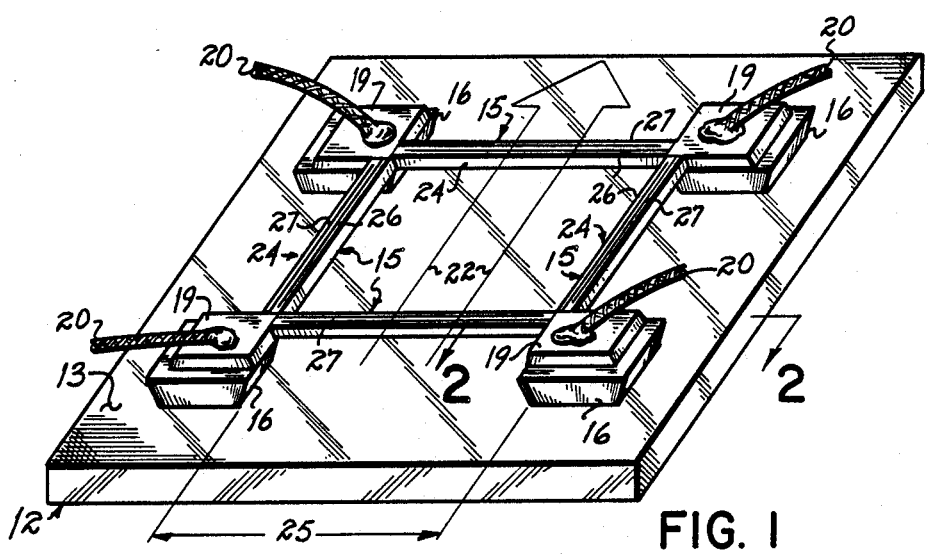
FIG. 1 shows a solid state microanemometer in accordance with a preferred embodiment of the invention.

FIG. 1 shows a solid state microanemometer 10 in accordance with a preferred embodiment of the invention. The microanemometer 10 includes a supporting base 12, which is preferably borosilicate glass. A top surface 13 of the glass plate 12 supports the microanemometer 10. Four resistor legs 15 define the sides of a square shaped Wheatstone bridge configuration with four supports 16 located at the corners. The supports 16 are preferably electrostatically bonded to the top surface 13 of base 12.

As is was well known in the art, electrostatically bonding is accomplished through application of high heat and high voltage to each of the respective bonding surfaces. The resistor legs 15 and the supports 16 are micromachined out of a single semiconductor crystal, such as silicon, which has been doped with a deep level impurity, such as gold, to a density of about $10^{15}$ atoms per cubic centimeter. The initial silicon crystal will also have been counter doped with phosphorus to about $5 \times 10^{14}$ A/cm$^3$.

An "open tube" process is utilized to dope the silicon crystal, thereby enabling one to vary parameters to achieve the desired concentration. This process entails the application of a commercially available gold spin on (gold suspended in a liquid matrix at a known concentration) to a neutral wafer surface such as silicon dioxide, or any other impervious surface. The wafer is mounted opposite the crystal into which the gold is to be diffused, with the distance between the surfaces being about one to several millimeters. Under the application of high temperature, i.e., about 1000° C., and in the presence of an inert gas, the gold will diffuse into the crystal. The final concentration can be obtained by measuring the resistivity of the crystal. Because both the diffusion time and the distance between the crystal and the wafer surfaces affect the final concentration, variation of these parameters will produce a crystal doped to the desired concentration, $10^{15}$ A/cm$^3$. In practice, a distance of 2 mm, a nitrogen flow rate of 500 cubic centimeters per minute for a duration of one hour at a temperature of 1000° C. has worked well.

Use of a dominant deep level impurity such as gold changes the temperature dependence of the semiconductor material from Eq (1) to:

$$R = BT^{3/2} \exp(-E/KT) \qquad \text{Eq (2)}$$

where B is the constant of proportionality, E is the characteristic activation energy of the deep impurity (typically equal to or half the ionization energy for a compensated deep impurity such as n-type gold doped silicon), K is Boltzmann's constant and T is temperature. In Equation (2), the impurity is in an exponential mode of incomplete ionization and the effect of the $T^{3/2}$ term is negligible compared to the exponential term, which can enhance the temperature sensitivity by as much as 100,000 percent.

Electrically conductive corner contacts 19 are located substantially on top of the supports 16. The contacts enable a voltage to be applied to each of the legs 15. Wire leads 20 of either aluminum or gold are connected to the corner contacts 19, preferably by ultrasonic bonding. Connection of the leads 20 from diagonally opposed corner contacts 19 to a voltage supply (not shown) produces a voltage drop across the resistors 15. Connection of a meter or signal processing circuitry (not shown) across the other diagonally opposed corner contacts 19 produces a quantified indication of the voltage drops along the resistors 15.

The change in the meter readings is used to detect the velocity of air flow, as shown by directional arrows 22. Due to the thermal isolation of the resistor legs 15 and the electrical isolation of the supports 16, this microanemometer 10 can be made much smaller than previous solid state anemometers without suffering from the corresponding problems related to heat build up in the crystal. For instance, the distance between adjacent supports 16, shown as dimension 25 in FIG. 1, may be reduced to 0.005" or smaller. As mentioned previously, as the size of the microanemometer 10 decreases, the response time is reduced. While prior solid state anemometers were formed on 1.5 × 1.5 mm sized crystals and had typical response times of several seconds up to several minutes duration, the microanemometer 10 of this dimension has resistor leg 15 lengths of about 0.005", or less, and detects a change in air flow within several hundred microseconds. Because of the reduced thermal mass, slight changes of relatively short duration are detected almost immediately.

Preferably, as shown in FIG. 1, each resistor leg 15 actually forms part of a spanning member 24 that extends between the adjacent supports 16 on each side of the Wheatstone bridge. The spanning member 24 includes the resistor leg 15 and two parallel electrically conductive contacts 26 and 27 that sandwich the resistor leg 15. Each conductor is connected at only one end to one of the contacts 19, with both conductors in the same spanning member 24 being connected to opposite contacts 19. As described previously, this configuration enables the applied voltage to be directed transversely to the orientation of each spanning member 24, and each resistor leg 15.

Figure 2:
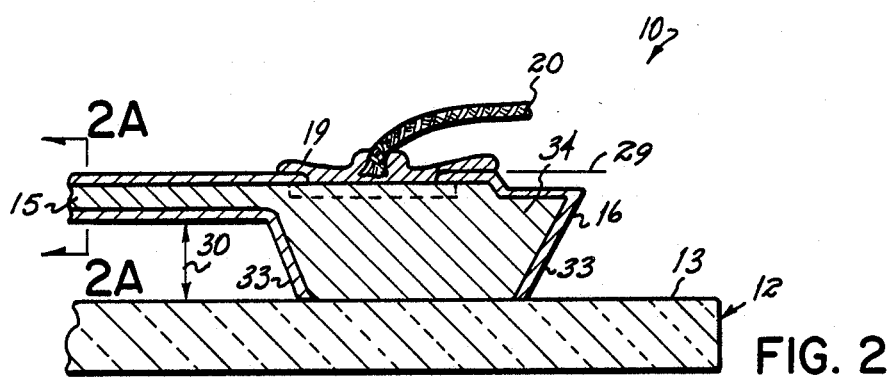
FIG. 2 is a cross-sectional view taken along lines 2—2 of FIG. 1.
Figure 2A:
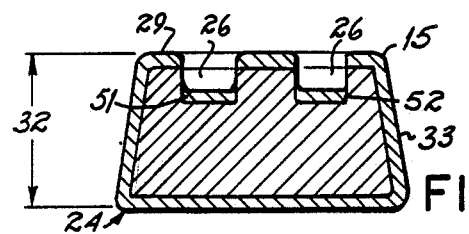
FIG. 2A is a cross-sectional view taken along lines 2A—2A of FIG. 2.

As shown more clearly in FIGS. 2 and 2A, the resistor legs 15 and the contacts 19 lie substantially in a common plane 29 that is at least a predetermined horizontal distance 30 above top surface 13. For a crystal having an initial thickness of 0.01", this distance 30 should be at least 0.009, producing a resistor leg 15 thickness of less than 0.001", and preferably about 0.0005". This thickness is indicated by reference number 32 in FIG. 2A. As mentioned previously, this distance 30 is equal to the depth of backside etching performed on the crystal. FIG. 2 also shows that the resistor leg 15 is integrally formed with the support 16. As mentioned previously, the resistor legs 15 and supports 16 are micromachined from a single crystal.

Preferably, a silicon dioxide passivation layer 33 covers and seals the otherwise exposed leg 15 and support 16 portions of the crystal. To provide an ohmic interface between the supports 16 and the contacts 19, a region 34 located therebetween is doped n+ prior to deposition of the electrically conductive material. This n+ region is preferably doped to a concentration of about $10^{18}$ atoms per cubic centimeter. If for structural reasons it is necessary to provide thicker resistor legs for more connection area with the corner supports, a p·n junction can be used to insure electrical isolation of the supports. In this case, a p+ region would be diffused in the crystal to isolate each support from its connected resistor legs 15.

The microanemometer 10 shown in FIGS. 1 and 2 is batch processed from a single gold doped silicon wafer partially compensated with phosphorus. Batch processing of solid state devices is well known in the art, and therefore FIGS. 3–9 show a preferred sequence of steps necessary to produce only one such microanemometer 10.

Figure 3:
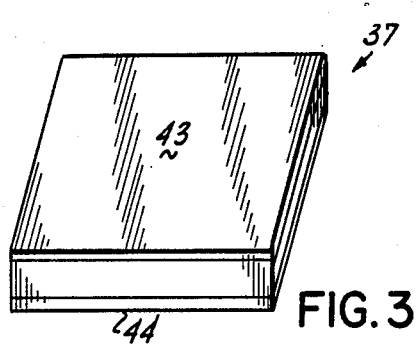
FIGS. 3-9 show a preferred sequence of steps performed upon a single silicon crystal in order to produce the microanemometer of FIGS. 1 and 2.

FIG. 3 shows a single silicon crystal 37 that has been doped with a deep level impurity, such as gold to a concentration of about $10^{15}$ A/cm$^3$. Doping can be accomplished in any one of a number of ways, including evaporation under the application of high heat, but is preferably achieved by the "open tube" process described previously. Subsequent to deep-level doping, the crystal 37 is thermally oxidized to create a silicon dioxide (SiO$_2$) passivation layer on at least the top 43 and bottom 44 surfaces.

Figure 4:
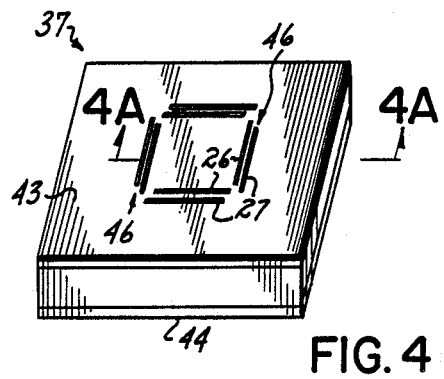

In the next step, shown in FIG. 4, four pairs of phosphorus diffused regions 46 are formed in top surface 43 of crystal 37. This phosphorus diffused regions will provide a good ohmic interface for the parallel conductors 26 and 27 to be subsequently deposited thereon, the gold doped silicon resistor legs 15 residing therebetween. Preferably, a photolithographic sequence of steps is used to diffuse the phosphorus into these regions 46. Initially, this requires application of a photosensitive polymer to top surface 43. A photographic plate is then placed upon the polymer coated top surface 43. The plate is actually a mask that is transparent to the light in some regions and opaque to light in other regions. Upon exposure to light, the photosensitive polymer or photoresist will be broken down at the unmasked areas of the top surface 43 (for a "positive" photoresist, although the opposite sequence would apply for a "negative" photoresist). In effect, this allows one to etch through the SiO2 layer 33 to leave the surfaces of crystal 37 exposed in the desired locations.

Figure 4A:
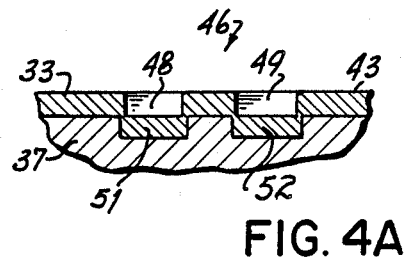
FIG. 4A is a cross-sectional view taken along lines 4A—4A of FIG. 4.

After removal of the masking plate and photoresist, etching of surface 43 removes portions of the exposed crystal 37 to produce voids 48 and 49, shown in FIG. 4A, into which aluminum or another conductive material will eventually be deposited in order to form the parallel contacts 26 and 27. However, prior to deposition of aluminum into these voids, regions 51 and 52 residing beneath the voids 48 and 49 are diffused or ion implanted with an n+ type material such as phosphorus. This n+ diffusion may be performed in any conventional manner. If desired, the masking plate may be oriented such that parallel voids 48 and 49 are somewhat offset, as shown in FIG. 4, so that parallel contacts 26 and 27 will likewise be offset, thereby facilitating subsequent connection to the contacts 19 at the corners of the Wheatstone bridge.

Figure 5:
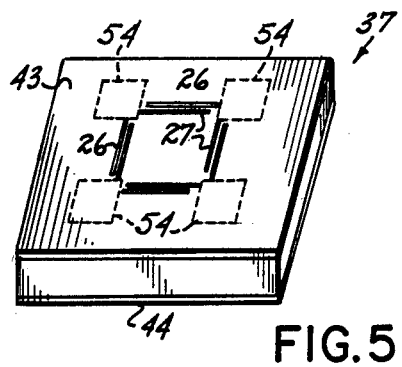

FIG. 5 shows initial formation of the top surface 54 of the supports 16 located at the corners of the Wheatstone bridge. Again, a photolithographic sequence is used to remove the silicon dioxide from each of the top surfaces 54. Subsequently, an n+ type shallow level impurity such as phosphorus is diffused in a conventional manner into these top surfaces 54, thus preparing the surfaces 54 for subsequent deposition of the contacts 19.

Figure 6A:
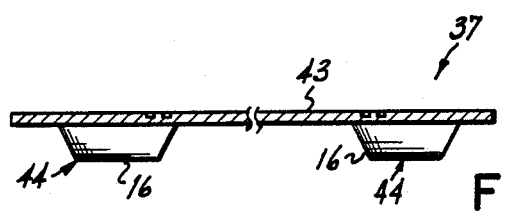
FIG. 6A is a cross-sectional view taken along lines 6A—6A of FIG. 6.
Figure 6:
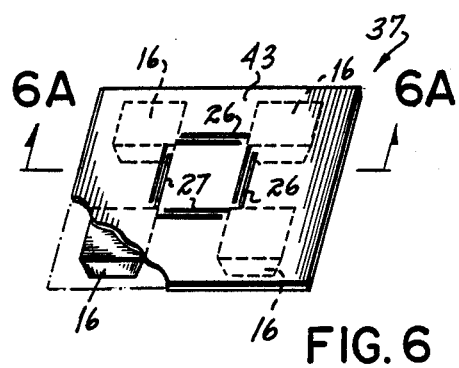

FIG. 6 shows the next step of the process, which entails etching the back side, or the bottom surface 44 of the crystal 37. Again, a photolithographic masking sequence is used to expose all of the bottom surface 44 of the crystal 37 except for the bottoms of the supports 16. Subsequently, the exposed portions of bottom surface 44 are anisotropically etched using an etchant such as KOH, EDP or a hydrazine solution to a depth of at least 0.009, which corresponds to the predetermined distance 30. FIG. 6A shows a cross-sectional view of what remains of the bottom surface 44 of etched crystal 37 after this step. Basically the remaining portion of bottom surface 44 will be the bottoms of the supports 16. Other than the supports 16, the thickness of the remaining membrane will typically be less than 0.001" and is preferably about 0.0005". While a different crystal orientation or plasma etching may be used to achieve vertical side walls in this step, use of a 100 oriented crystal with an anisotropic etchant results in supports 16 with angular sides, and produces reduced contacting surfaces at the bottom of the supports 16. As part of this step, the remaining underside of crystal 37 is oxidized to provide a bottom sealing layer of silicon dioxide.

Figure 7:
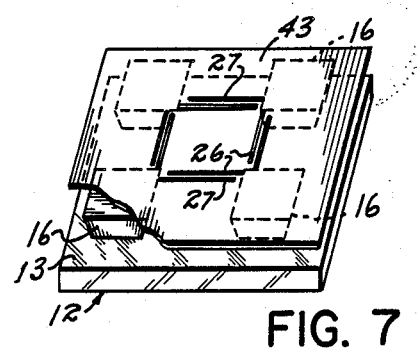

In the next step, shown in FIG. 7, the bottom surfaces of the four supports 16 are electrostatically bonded to the top surface 13 of the borosilicate glass base 12. Basically, electrostatic bonding comprises the application of high voltage and high temperature to the bonding surfaces, the heat being several hundred degrees centigrade and the voltage being on the order of a thousand volts.

Figure 8:
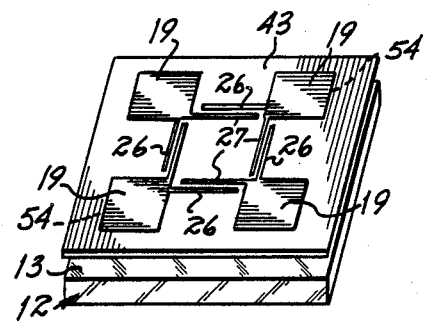

FIG. 8 shows an electrically conductive material such as aluminum evaporated or deposited onto the top surfaces 54 of the supports 16 and within each pair of parallel voids 48 and 49 to form, respectively, the contacts 19 located at the corners and the conductor pairs 26 and 27 of each spanning member 24.

Figure 9:
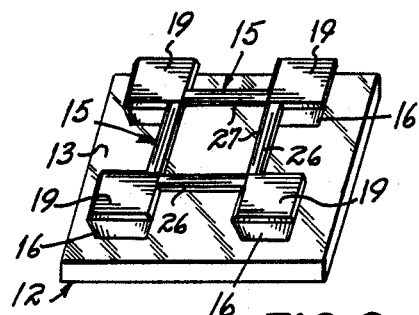

FIG. 9 shows the final micromachining step. Top surface 43 of crystal 37 is etched away to produce the final Wheatstone bridge configuration, leaving only the contacts 19, the parallel conductors 26 and 27 and the resistor legs 15 residing therebetween. An etchant such as hydrazine is used in this step, because hydrazine does not adversely affect the already deposited aluminum.

Due to the miniaturization achieved with this solid state microanemometer, an array of such devices can be connected to associated computer interfaces to provide "intelligent" sensing of microflow patterns for medical, industrial and other applications. This disposition of the array could also be such that flow direction could be sensed.

While a preferred embodiment of the invention has been described and a preferred method for forming the invention, applicant does not wish to be limited thereby, and it is to be understood that various modifications could be made without departing from the spirit of the invention. Accordingly, it is to be understood that changes may be made without departing from the scope of the invention as particularly set out and claimed.

I claim:

1. A solid state microanemometer comprising:
 a non-conductive base having a top surface;
 four semiconductor supports located above said top surface; and
 a Wheatstone bridge comprising four semiconductor resistor legs interconnected in a substantially common plane to four electrically conductive contacts located on top of said four supports, said common plane being at a predetermined distance above said top surface, thereby to substantially thermally isolate said resistors from said base and said supports.

2. The microanemometer of claim 1 wherein said four semiconductor supports are electrostatically bonded to said top surface.

3. The microanemometer of claim 1 wherein said base is of borosilicate glass.

4. The microanemometer of claim wherein said resistor legs comprise a semiconductor material doped with a deep level impurity.

5. The microanemometer of claim 4 wherein said deep level impurity is gold.

6. The microanemometer of claim 4 wherein said supports are also doped with a deep level impurity, the legs and the supports being micromachined from a single semiconductor crystal.

7. The microanemometer of claim 6 wherein said crystal is silicon.

8. The microanemometer of claim 1 wherein the distance between adjacent supports is less than 0.005 inches.

9. The microanemometer of claim 1 and further comprising:
 an n+ region residing beneath each of the contacts.

10. The microanemometer of claim 9 wherein said n+ diffused regions comprise a phosphorus diffused semiconductor.

11. The microanemometer of claim 1 wherein said contacts are aluminum.

12. The microanemometer of claim 1 wherein each said resistor leg is located on a spanning member that bridges between adjacent supports, each spanning member further comprising:
a pair of parallel electrical conductors sandwiching said resistor leg, each conductor connected at one end only to one of said supports, the conductors being connected to different supports, thereby to cause applied voltage to each said resistor to be directed transverse to the orientation of said spanning member.

13. The microanemometer of claim 11 wherein said spanning member further comprises:
a diffused n+ region located beneath each of said conductors.

14. The microanemometer of claim 13 wherein said diffused n+ region is silicon diffused with phosphorus.

15. The microanemometer of claim 6 wherein an outer surface of said crystal is coated with a passivation layer.

16. The microanemometer of claim 15 wherein said crystal is silicon and said passivation layer is silicon dioxide.

17. The microanemometer of claim 1 wherein said supports have a thickness of about 0.01" and said plane is located at least 0.009" above said top surface.

18. A solid state microanemometer comprising:
a borosilicate base having a top surface;
a deep level doped semiconductor crystal having top and bottom etched surfaces, the etched surfaces defining four corner supports interconnected by four spanning members, the supports being electrostatically bonded to said top surface to place said spanning members a predetermined distance above said top surface;
four electrically conductive contacts located substantially on top of said corner supports for applying a voltage across each of said spanning members.

19. The solid state microanemometer of claim 18 and further comprising:
electrical leads ultrasonically bonded to said contacts.

20. The solid state microanemometer of claim 18 wherein said crystal is gold doped silicon.

21. The solid state microanemometer of claim 18 and further comprising:
an n+ region residing between said crystal and said conductive contacts.

22. The solid state microanemometer of claim 20 and further comprising:
a silicon dioxide boundary layer on the surface of said crystal.

23. The solid state microanemometer of claim 18 wherein the length of each said spanning member is less than 0.005 inch.

24. The solid state microanemometer of claim 18 wherein said crystal has an initial thickness of about 0.01" and said predetermined distance is at least 0.009".

25. A method of forming a solid state microanemometer out of a single crystal comprising the steps of:
etching a backside surface of said crystal to provide four supports;
bonding said supports to a base;
etching a frontside surface of said bonded crystal to provide four spanning members interconnecting said supports, said spanning members being located a predetermined distance above said base; and
depositing electrically conductive contact material on top of said supports.

26. The method of claim 25 wherein said crystal is anisotropically etched.

27. The method of claim 26 wherein said crystal is isotropically etched.

28. The method of claim 25 wherein said supports are electrostatically bonded to said base.

29. The method of claim 25 and further comprising the step of:
doping said crystal with a deep level impurity prior to said etching steps.

30. The method of claim 29 wherein said deep level doped crystal is gold doped silicon.

31. The method of claim 25 and further comprising the step of:
diffusing, prior to said depositing step, an n+ material into said crystal at regions where said electrically conductive material is to be deposited, thereby to provide ohmic contact between the subsequently deposited electrically conductive material and the crystal.

32. The method of claim 31 wherein said diffusing and said depositing steps produce, on each said spanning member, a parallel pair of electrically conductive members that sandwich a resistor leg, thereby to enable a voltage applied to each said resistor to be directed transverse to the orientation of said spanning member.

33. The method of claim 25 and further comprising the step of:
forming a passivation layer on the exposed surfaces of said crystal.

34. The method of claim 29 wherein said crystal is silicon and further comprising the step of:
forming a silicon dioxide layer on the exposed surface of said silicon crystal.

35. The method of claim 25 and further comprising the step of:
ultrasonically bonding electrical leads to said electrically conductive contacts above said supports.

36. A solid state microanemometer comprising:
a non-conductive base having a top surface;
four semiconductor supports located above said top surface; and
a Wheatstone bridge comprising four semiconductor resistor legs interconnected to four electrically conductive contacts located on top of said four supports, each of said supports being electrically isolated from the other said supports and said resistor legs.

37. The solid state microanemometer of claim 36 and further comprising:
a p+ region substantially electrically isolating each of said supports from two connected resistor legs.

38. The solid state microanemometer of claim 36 wherein one of said resistor legs is located a predetermined distance above said top surface.

39. The solid state microanemometer of claim 36 wherein said four supports and said four resistor legs further comprise:
a single semiconductor crystal doped with a deep level impurity.

* * * * *

UNITED STATES PATENT AND TRADEMARK OFFICE
CERTIFICATE OF CORRECTION

PATENT NO. : 4,930,347

DATED : June 5, 1990

INVENTOR(S) : H. Thurman Henderson

It is certified that error appears in the above-identified patent and that said Letters Patent is hereby corrected as shown below:

Column 8, line 49, insert -- 1 -- after "claim" and before "wherein"

Signed and Sealed this

Twenty-fifth Day of February, 1992

Attest:

HARRY F. MANBECK, JR.

*Attesting Officer*      *Commissioner of Patents and Trademarks*